United States Patent
Mazzocco

(10) Patent No.: US 7,874,072 B2
(45) Date of Patent: Jan. 25, 2011

(54) BEARING SUPPORT, PARTICULARLY FOR A FAN CASING, AND METHOD FOR MANUFACTURING THEREOF

(75) Inventor: Roberto Mazzocco, Roveredo in Piano (IT)

(73) Assignee: Electrolux Home Products Corporation N.V., Zaventem (BE)

( * ) Notice: Subject to any disclaimer, the term of this patent is extended or adjusted under 35 U.S.C. 154(b) by 985 days.

(21) Appl. No.: 11/686,397

(22) Filed: Mar. 15, 2007

(65) Prior Publication Data

US 2007/0151105 A1    Jul. 5, 2007

Related U.S. Application Data

(62) Division of application No. 11/125,582, filed on May 10, 2005, now abandoned.

(30) Foreign Application Priority Data

Jun. 18, 2004    (EP) .................................. 04102808

(51) Int. Cl.
   *B21K 1/76* (2006.01)
(52) U.S. Cl. ................. 29/898.12; 29/898; 29/898.049; 29/527.1; 384/536; 384/537
(58) Field of Classification Search ............... 29/898, 29/898.07, 898.12, 898.049; 384/499–501, 384/504, 510, 512, 520, 536, 537
   See application file for complete search history.

(56) References Cited

U.S. PATENT DOCUMENTS

| 4,715,780 A | 12/1987 | Kan |
| 4,925,322 A | 5/1990 | Hishida |
| 4,955,791 A * | 9/1990 | Wrobel ........................ 417/354 |
| 5,038,460 A | 8/1991 | Ide et al. |
| 5,249,871 A | 10/1993 | LaTorre et al. |
| 5,267,842 A * | 12/1993 | Harmsen et al. ............ 417/354 |
| 5,407,508 A * | 4/1995 | Harris et al. ................ 156/173 |
| 5,436,519 A * | 7/1995 | Takahashi et al. ..... 310/216.114 |
| 5,728,343 A | 3/1998 | Ueno |
| 6,120,243 A * | 9/2000 | Tanabe ........................ 415/112 |
| 6,394,767 B1 * | 5/2002 | Matsumoto .............. 417/423.1 |
| 6,517,251 B1 * | 2/2003 | Williams ..................... 384/536 |
| 7,036,391 B2 | 5/2006 | Tsuchiya et al. |
| 2002/0006241 A1 | 1/2002 | Rode |
| 2005/0281501 A1* | 12/2005 | Mazzocco ................... 384/537 |

FOREIGN PATENT DOCUMENTS

DE    4235611 A1 *    4/1994

OTHER PUBLICATIONS

Machine Translation of DE 4235611 A1, Apr. 1994.*

* cited by examiner

*Primary Examiner*—David P Bryant
*Assistant Examiner*—Ryan J Walters
(74) *Attorney, Agent, or Firm*—Pearne & Gordon LLP

(57) ABSTRACT

A method is provided for manufacturing a bearing support, particularly for a fan casing. The method includes the step of placing a bearing assembly in correspondence to a matrix die of an injection mold. The method further includes the step of abutting a punch of the injection mold on the bearing assembly to coaxially align and axially clamp the bearing assembly. The method further includes the step of injecting a plastic material into the mold to form an assembly sheath over-injected on outer surfaces of the bearing assembly.

4 Claims, 3 Drawing Sheets

Figure 1:
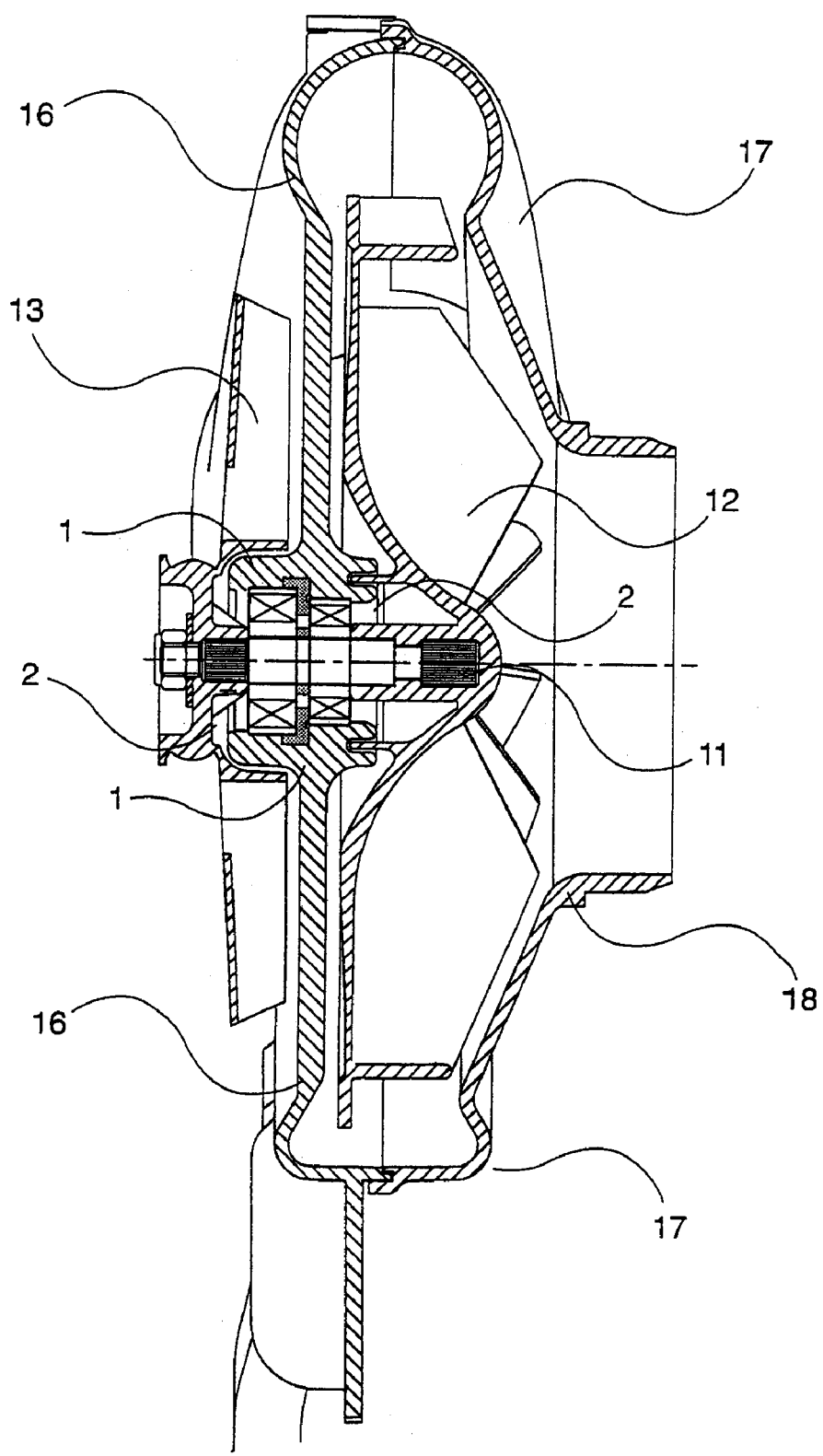

BEARING SUPPORT, PARTICULARLY FOR A FAN CASING, AND METHOD FOR MANUFACTURING THEREOF

The present invention refers to bearing support, particularly for a fan casing, and method for manufacturing thereof.

Commonly clothes dryers or clothes washers with drying means are equipped with a fan or ventilator adapted to draw air into the drum to dry the clothes.

The fan comprises an impeller driven by a shaft and a fan casing, which contains the impeller and forms an intake and an outlet for the air.

The fan casing consists of a rear shell attachable to a cover element, the former providing a seat for bearings adapted to be coupled to the fan shaft.

As known in the art the rear shell is first obtained from die-casting process and then machined with accuracy in correspondence to the bearing seat wherein the bearings are to be housed. Special-purpose tooling are needed to fix in position the bearings in the seat, such tooling providing the suitable positioning force required to mount the bearings into the seat and also providing the correct position of the bearings inside the seat.

A bearing with smaller diameter, a spacer, and a bearing with a greater diameter and as last a safety ring are assembled in sequence into the seat so that the bearings are coaxially arranged and axially spaced apart from one another by means of the spacer.

A suitable pin coupled to the bearings and appropriate positioning glides ensure the correct reciprocal position of the two bearings during the mounting phase.

This type of bearing assembly has been found to have many drawbacks.

A very accurate machining of the bearing seat and a very accurate mounting of the bearings are needed to achieve a perfect alignment of the bearings and prevent any clearances between the bearings and between each bearing and the seat. Since such operations are quite complicated to be accomplished and it is difficult to attain the required grade of accuracy for all bearing assembly mounted in the ventilators to be manufactured non perfect alignment and clearances often occur causing vibration and noise during fan operating.

A further drawback is that the use of special-purpose tooling and accurate positioning guides enhances the difficulty and complexity of the bearing mounting operations and hence also the probability of bearing misalignment and/or clearances in the bearing seat becomes increased.

A further drawback is that the method of manufacturing the fan casing shell supporting the bearing assembly is time-consuming since it comprises a plurality of steps, i.e. a die-casting phase, a bearing seat machining phase and bearing mounting phase and this causes an increase of the overall cost.

The aim of the present invention is therefore to provide a bearing support and a method for manufacturing thereof which solve the noted problems, eliminating the drawbacks of the cited known art.

A further purpose of the present invention is to provide a bearing support, which is relatively simple in construction, reliable, and relatively inexpensive to manufacture.

Figure 2:
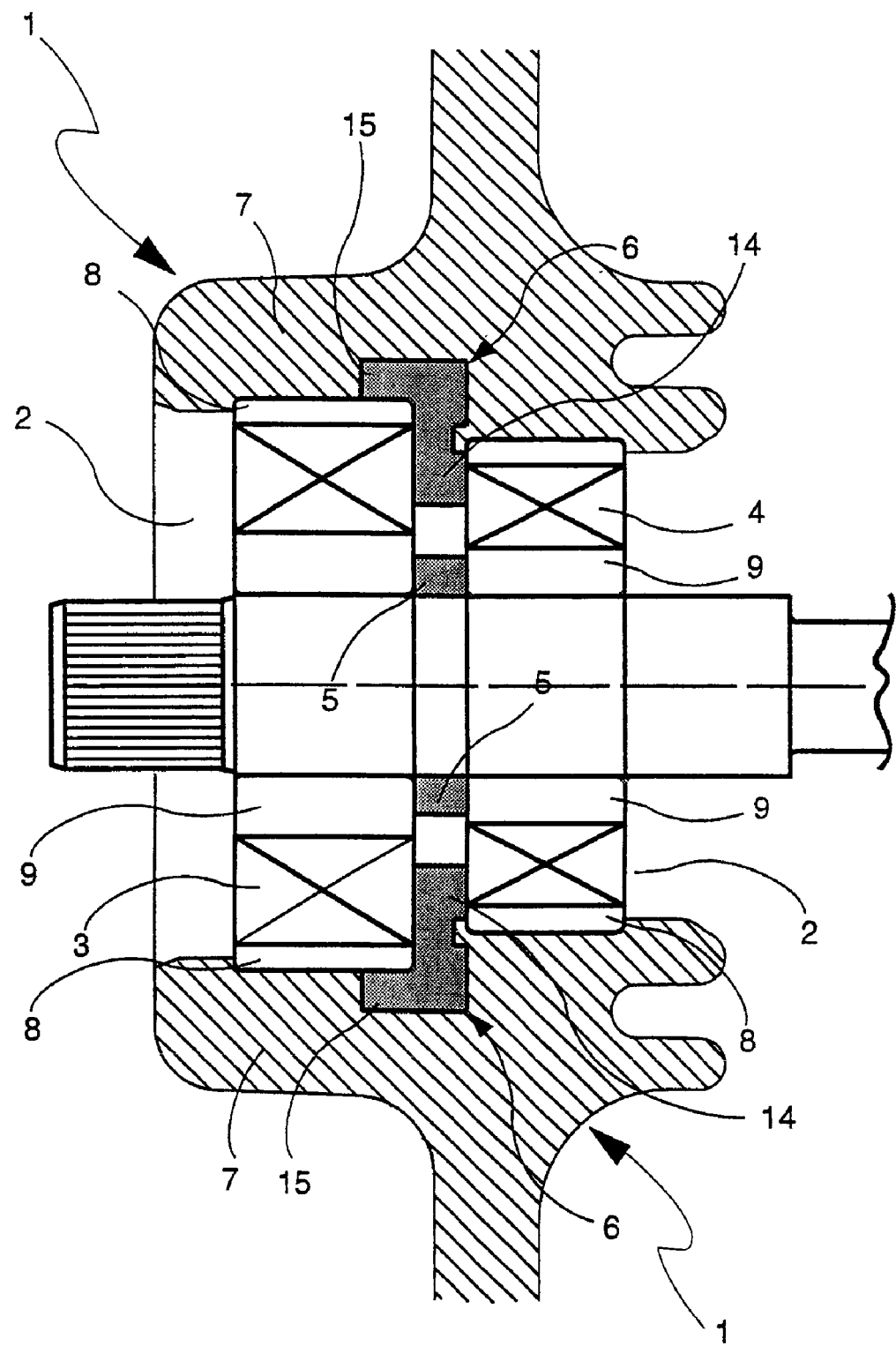
Figure 3:
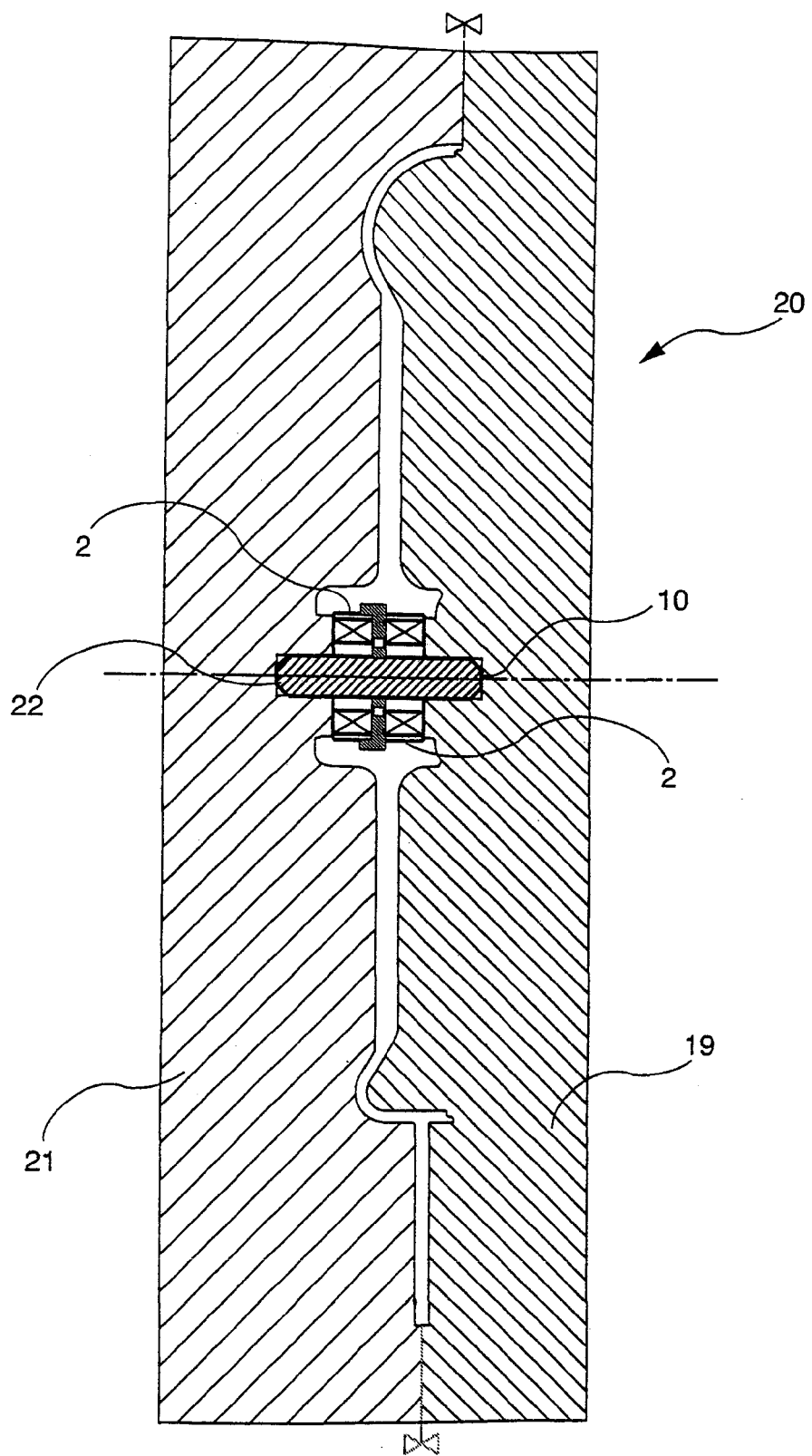

Additional features and advantages of the invention will be set forth in the description, which follows, and in part will be apparent from the description, or may be learned by practice of the invention. The objectives and other advantages of the invention will be realised and attained by the structure and the method particularly pointed out in the written description, by way of a non-limiting example, and claims hereof as well as the appended drawings, in which FIG. 1 is a sectional view of a ventilator comprising a bearing support according to the present invention;

FIG. 2 is an enlarged view of the detail of the bearing support shown in FIG. 1;

FIG. 3 is a sectional view of the bearing assembly placed in an injection mold according to the present invention With reference to the FIGS. 1 and 2, an embodiment of a bearing support, particularly for a fan casing, according to the present invention, generally designated by the reference numerical 1, comprises a bearing assembly 2 including at least a couple of bearings 3,4 coaxially arranged and axially spaced apart from one another by means of at least one spacer member 5,6.

Expediently the bearing support 1 comprises a sheath 7 over-injected on outer surfaces of the bearing assembly 2, the sheath 7 being adapted to house and fix in aligned position said bearings 3,4 so as to prevent the bearings 3,4 to vibrate under operating condition.

The bearing assembly 2 comprises two bearings of different size and in particular a first bearing 3 having a greater diameter and a second bearing 4 with a smaller diameter. Each bearing 3,4 has an outer race ring 8, an inner race ring 9 and an annular plurality of rolling means (not shown) arranged to roll on the raceways formed by both race rings 8,9. The inner race rings 9 are axially aligned and spaced apart from one another by a first inner spacer ring 5 so as to provide a central axial bore 10 adapted to receive an fan shaft 11.

The fan shaft 11 has an operating position in which it is coupled to the bearings 3,4 and the ends of the fan shaft 11 protrude from the central axial bore 10 to be associated to an impeller 12 at one side and to a driving pulley 13 at the other side.

The bearing assembly 2 further comprises an outer spacer member 6 having an annular portion 14 arranged into the gap between the two outer race rings 8 so as to axially spaces apart the outer race rings 8. The outer spacer member 6 is provided with a flange portion 15 which projects from the annular portion 14 and extends axially over a part of the outer race ring 8 of the bearing 3 with greater diameter. In this embodiment the impeller 12 is of the type for a centrifugal fan.

The sheath 7, which is over-injected on outer surfaces of the assembly 1, is adapted to house and clamp the assembly so as to keep the bearings 3,4 aligned in their reciprocal position without radial and axial clearance.

The sheath 7, preferably of a vibration-free and noise-damping plastic material, e.g. polyurethane, extends over the outer surfaces of the two outer race rings 8. The flange portion 15 of the outer spacer member 6 is embedded in the plastic sheath 7 providing further fixing surfaces for the plastic sheath 7.

An annular body 16 is integrally formed in one piece with the sheath 7 to provide a fan casing 17 adapted to contain the impeller 12.

In the embodiment proposed the annular body 16 defines the rear portion of the fan casing 17 extending between the driving pulley 13 and the impeller 12 and being adapted to be associated to a fan cover 18.

In a method for manufacturing the bearing support 1, particularly for a fan casing, according to the present invention the bearing assembly 2 is placed in correspondence to a matrix die 19 of a injection mould 20.

For this purpose gauging means are provided to assemble the bearing assembly 2. Such gauging means comprise a gauging pin 22 (not shown) on which the bearings 3,4 and the spacer members 5,6 are mounted so as to be correctly positioned. The gauging pin 22 axially projects from the bearing assembly so that a first end of the pin 22 is adapted to be accommodated in a first bush provided in the matrix die 19.

A punch 21 of the injection mold 20 is then moved towards the matrix die 19 so that the punch 21 abuts on the bearing assembly 2. The punch 21 is provided with a second bush adapted to receive a second end of the gauging pin 22 as shown in FIG. 3.

Obviously the gauging pin 22 can be in a single-piece construction with the matrix die 19 or the punch 22.

The punch 21 co-operating with the matrix die 19 and the gauging pin 22 coaxially align and axially clamp the bearing assembly 2 so as to prevent penetrations of material to be injected inside the central axial bore 10 and the bearings 3,4.

Clearly it is to be noted that the matrix die 19 and the punch 21 are suitably shaped in correspondence to the bearings 3,4 so that during the injection phase plastic material can not penetrate between the outer and inner race rings 8,9 preventing the bearing blocking.

For the same purpose also the outer spacer member 6 is suitably formed to prevent penetrations of plastic material between the axial gap of the bearings 3,4.

Afterwards plastic material is injected into the mold to produce the sheath 7, plastic material being over-injected on outer surfaces of the bearing assembly 2, the same forming a compact unit with the bearing assembly 2.

After the sheath 7 is formed the plastics cools and shrinks so that the bearings 3,4 and the spacer members 5,6 are secured and retained axially and radially without clearance.

Advantageously the annular body 16 is produced integrally in one piece with the sheath 7 in the same injection mold 20.

Conclusively, it can therefore be stated that the bearing support according to the present invention eliminates the vibrations connected to the misalignment and clearances of the bearings.

An advantage of the present invention is that the support bearing is inexpensive to be manufactured and reliable.

Another advantage of the present invention is to provide a fan casing with a bearing assembly easy and inexpensive to be manufactured.

Another advantage of the present invention is to provide a method for manufacturing a bearing support, which ensures a perfect bearing alignment and prevents any bearing clearances thereby doing away with the serious drawback shared by the prior-art connected to vibrations and noise.

The method according to the invention eliminates the bearing seat machining phase and the bearing mounting phase thereby making the method extremely easy to be accomplished and inexpensive.

The method according to the invention has the advantage that assembly of the axially adjacent bearings with the spacer member and subsequent introduction into the injection mold are simple steps which known automatic facilities and machinery can perform economically in high-run series manufacture.

The invention claimed is:

1. Method for manufacturing a bearing support, particularly for a fan casing, comprising the following steps:

placing a bearing assembly in correspondence to a matrix die of an injection mold, said bearing assembly comprising at least two bearings coaxially arranged and axially spaced apart from one another by at least one spacer member, said bearing assembly defining a central axial bore;

abutting a punch of said injection mold on the bearing assembly to coaxially align and axially clamp said bearing assembly so as to prevent penetrations of material to be injected inside the central axial bore and the bearings; and injecting a plastic material into the mold to form an assembly sheath over-injected on outer surfaces of the bearing assembly and an annular body produced integrally with said assembly sheath, wherein said annular body defines at least a portion of a fan casing adapted to contain an impeller.

2. Method according to claim 1, comprising the step of providing gauging means to correctly assemble the bearing assembly in the injection mold.

3. Method according to claim 1, comprising the step of providing the matrix die and the punch shaped in correspondence to the bearings so that during the injection step plastic material is prevented from penetrating between outer and inner race rings of the bearings.

4. Method according to claim 1, comprising the step of providing the at least one spacer member shaped so as to be adapted to prevent penetrations of plastic material between a gap of the bearings.

* * * * *